United States Patent
Fatemieh et al.

(10) Patent No.: US 12,158,898 B2
(45) Date of Patent: *Dec. 3, 2024

(54) EXECUTION-TIME DYNAMIC RANGE PARTITIONING TRANSFORMATIONS

(71) Applicant: Google LLC, Mountain View, CA (US)

(72) Inventors: Seyed Omid Fatemieh, Bellevue, WA (US); Mikhail Entin, Redmond, WA (US); Adrian Baras, Mountain View, CA (US); Pavan Edara, Mountain View, CA (US); Aleksandras Surna, Redmond, WA (US)

(73) Assignee: Google LLC, Mountain View, CA (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/814,694

(22) Filed: Jul. 25, 2022

(65) Prior Publication Data
US 2022/0358142 A1    Nov. 10, 2022

Related U.S. Application Data

(63) Continuation of application No. 16/872,238, filed on May 11, 2020, now Pat. No. 11,423,049.

(51) Int. Cl.
G06F 16/27 (2019.01)
G06F 16/23 (2019.01)

(52) U.S. Cl.
CPC ........ G06F 16/278 (2019.01); G06F 16/2386 (2019.01)

(58) Field of Classification Search
CPC ..................... G06F 16/278; G06F 16/24554
See application file for complete search history.

(56) References Cited

U.S. PATENT DOCUMENTS 5,966,704 A    10/1999   Furegati et al.
8,271,523 B2    9/2012   Hattori
(Continued)

FOREIGN PATENT DOCUMENTS

WO    2016191995 A1    12/2016

OTHER PUBLICATIONS

India Patent Office, Indian Examination Report for the related Application No. 202247069576, dated Feb. 5, 2023, 6 pages.
(Continued)

*Primary Examiner* — Amanda L Willis
(74) *Attorney, Agent, or Firm* — Honigman LLP; Brett A. Krueger

(57) ABSTRACT

An example method includes receiving a data load request requesting loading and partitioning of an unknown quantity of user data for storage at a data storage system. The user data including a partitioning key; a total data size of the user data; a plurality of rows, each row of the plurality of rows associated with a value defined by the partitioning key; and one or more columns. The method also includes identifying one or more storage constraints for the data storage system. The method further includes, after receiving the user data, determining a plurality of partitioning quantiles defining respective ranges of values of the partitioning key based on the user data and the one or more storage constraints for the data storage system; and range partitioning each row of the user data into files based on the value associated with the row defined by the partitioning key, and the respective ranges of the values of the partitioning key defined by the plurality of partitioning quantiles.

20 Claims, 7 Drawing Sheets

(56) References Cited

U.S. PATENT DOCUMENTS

| | | |
|---|---|---|
| 9,053,167 B1 | 6/2015 | Swift et al. |
| 2008/0082769 A1 | 4/2008 | Bouchou et al. |
| 2016/0055192 A1 | 2/2016 | Bensberg et al. |
| 2016/0092517 A1 | 3/2016 | Viel et al. |
| 2016/0253402 A1 | 9/2016 | Klots et al. |
| 2018/0068008 A1 | 3/2018 | Cruanes et al. |
| 2020/0134081 A1 | 4/2020 | Ho |
| 2020/0159594 A1 | 5/2020 | Kyaw et al. |
| 2020/0301878 A1 | 9/2020 | Netla et al. |

OTHER PUBLICATIONS

Versioning Policy [date unknown—but likely not substantially older than Sep. 30, 2021], postgresql.org, https://www.postgresql.org/support/versioning/.

PostSQL 8.1.23 Documentation 2005, PostgreSQL Golbal Development Group, https://www.postgresql.org/docs/8.1/index.htnnl; /ddl-partitioning.htnnl; /sql-copy.html; /populate.html.

Matthew et al., Beginning Databases with PostgreSQL; From Novice to Professional 2005, Apress, 2nd ed., pp. 543-587.

Knuth, The Art of Computer Programming 1998, Addison-Wesley, vol. 3, 2nd ed6, pp. 1-5.

Sort Feb. 12, 1997, FOLDOC, http://foldoc.org/sorting.

Sort [date unknown], merriam webster, https://www.merriam-webster.com/dictionary/sort.

International Search Report and Written Opinion for the related Application No. PCT/US2021029499, dated Aug. 4, 2021, 31 pages.

Ghandeharizadeh Shahram et al: "Hybrid-Range Partitioning Skate y: A New Deelustering Strategy for Multiprocessor 8 atabase Machines", Proceedings of the 16th VLOB Conference, 1990, pp. 481-492, XP055827609, Brisbane, Australia Retrieved from the Internet: URL :<http://www.vldb.org/conf/1990/P481.POF>//www.vldb.org/conf/1990/P481.POF <http://www.vldb.org/conf/1990/P481.POF> [retrieved on Jul. 26, 2021].

Colucci Rafael et al: "Table partitioning using 2 columns", stack overflow, 2019, pp. 1-1, XP055827604, Retrieved from the Internet: URL:https://stackoverflow.com/questions/4671161 /table- partitioning-using-2-columns [retrieved on Jul. 26, 2021].

Sort [date unknown], merriam webster, https://www.merriam-webster.com/dictionary/sort Accessed Oct. 18, 2021.

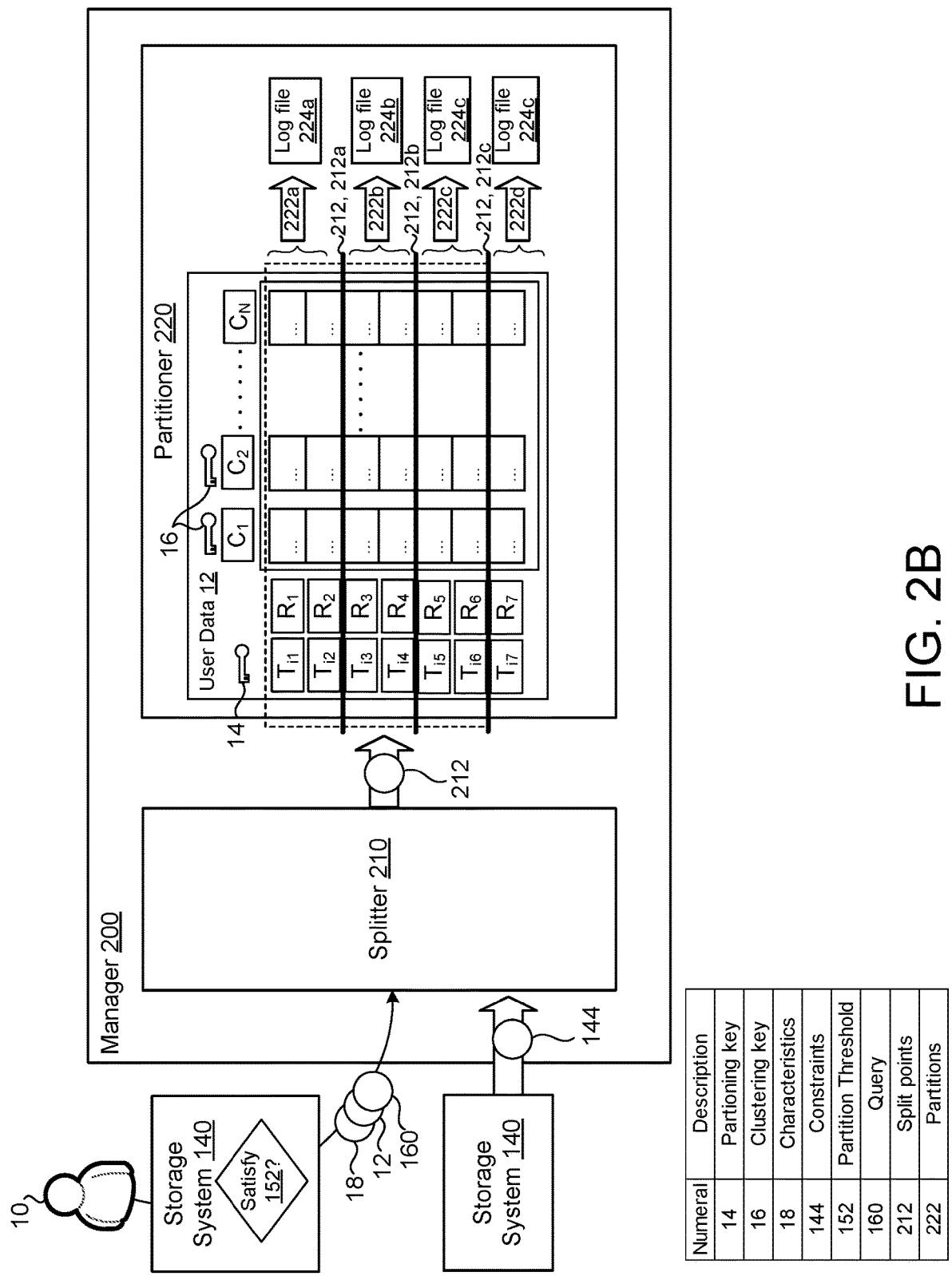

EXECUTION-TIME DYNAMIC RANGE PARTITIONING TRANSFORMATIONS

CROSS REFERENCE TO RELATED APPLICATION

This U.S. patent application is a continuation of, and claims priority under 35 U.S.C. § 120 from, U.S. patent application Ser. No. 16/872,238, filed on May 11, 2020. The disclosure of this prior application is considered part of the disclosure of this application and is hereby incorporated by reference in its entirety.

TECHNICAL FIELD

This disclosure relates to execution-time dynamic range partitioning transformations.

BACKGROUND

As cloud storage has become more popular, clustered and partitioned data layouts are increasingly being used to reduce query cost and improve query performance. Because the size of many tables necessitates splitting the table across many different servers, clusters of data blocks are typically sorted by a clustering key in order to co-locate related data. Each data block includes a range of data block values. When partitioning data into partitioned and/or clustered structures, parameters are often required to define how the partitioning is to be applied to the data. Unfortunately, the partitioning parameters are often unknown until execution of the partitioning process; preventing or hindering the ability of queryable data to be stored based on particular types of partitions in a dynamic manner.

SUMMARY

One aspect of the disclosure provides a method for execution-time dynamic range partitioning. The method includes receiving, at data processing hardware, from a user of a data storage system, user data including a partitioning key, a clustering key, and a respective number of total rows defining a total data size of the user data. Each row of the user data is associated with a respective value defined by the partitioning key and includes one or more columns. The method also includes identifying, at the data processing hardware, storage constraints for the data storage system. The storage constraints include a target file size and a target number of rows per file. The method further includes determining, by the data processing hardware, a plurality of split points for the user data. The plurality of split points are based on the respective number of total rows of the user data, the total data size of the user data, the target file size from the storage constraints, and the target number of rows per file from the storage constraints. The method also includes generating, by the data processing hardware, partitioning quantiles from the plurality of split points. The partitioning quantiles define a range between each split point of the plurality of split points. The method further includes range partitioning, by the data processing hardware, each row of the user data into files based on the respective values defined by the partitioning key using the partitioning quantiles. The files store the user data and are configured to construct a table sorted according to the clustering key.

Implementations of the disclosure may include one or more of the following optional features. In some implementations, the method includes receiving, at the data processing hardware, from the user of the data storage system, a data load request requesting that the data storage system range partition an unknown quantity of future user data, and the received user data includes the unknown quantity of future user data. Here, the data load request may request the data storage system to use the clustering key to store the future user data. Optionally, the data load request may occur at a data query system in communication with the data storage system, the data query system configured to query data of the user stored in the data storage system. The user data may correspond to a quantity of streaming user data that satisfies a dynamic range partitioning threshold, the dynamic range partitioning threshold indicating a minimum total data size.

In some configurations, range partitioning each row of the user data into files based on the respective values defined by the partitioning key using the partitioning quantiles includes generating an empty partition for any missing value and during execution of a query on the user data identifies that the query includes a respective missing value and excludes the empty partition from read operations of the query. Here, the method may include receiving, at the data processing hardware, a maximum number of partitions for range partitioning and determining, by the data processing hardware, that a respective number of non-empty partitions is less than the maximum number of partitions. Determining that the respective number of partitions is less than the maximum number of partitions may include generating a count of a number of distinct values defined by the partitioning key in the user data and comparing the count of the number of distinct values defined by the partitioning key in the user data to the maximum number of partitions.

In some examples, the storage constraints include a maximum number of partitions and the method includes determining, by the data processing hardware, whether the number of the generated partitioning quantiles is less than the maximum number of partitions. In this example, range partitioning each row of the user data into the files based on the respective values defined by the partitioning key using the partitioning quantiles occurs when the number of the generated partitioning quantiles is less than the maximum number of partitions.

In some implementations, the method includes receiving, at the data processing hardware, from the user of the data storage system, a data load request requesting that the data storage system range partition an unknown quantity of future user data, the received user data including the unknown quantity of future user data. In this implementation, the method includes receiving, at the data processing hardware, a maximum number of partitions for the range partitioning and during run-time for the data load request, determining, by the data processing hardware, whether the number of the generated partitioning quantiles is greater than the maximum number of partitions. In this implementation, range partitioning each row of the user data into the files based on the respective values defined by the partitioning key using the partitioning quantiles fails to execute when the number of the generated partitioning quantiles is greater than the maximum number of partitions.

Another aspect of the disclosure provides a system for execution-time dynamic range partitioning. The system includes data processing hardware and memory hardware in communication with the data processing hardware. The memory hardware stores instructions that when executed on the data processing hardware cause the data processing hardware to perform operations. The operations include receiving, from a user of a data storage system, user data including a partitioning key, a clustering key, and a respective number of total rows defining a total data size of the user data, each row of the user data associated with a respective value defined by the partitioning key and including one or more columns. The operations also include identifying storage constraints for the data storage system, the storage constraints include a target file size and a target number of rows per file. The operations further include determining a plurality of split points for the user data based on the respective number of total rows of the user data, the total data size of the user data, the target file size from the storage constraints, and the target number of rows per file from the storage constraints. The operations also include generating partitioning quantiles from the plurality of split points, the partitioning quantiles defining a range between each split point of the plurality of split points. The operations further include range partitioning each row of the user data into files based on the respective values defined by the partitioning key using the partitioning quantiles. The files store the user data and are configured to construct a table sorted according to the clustering key.

This aspect may include one or more of the following optional features. In some configurations, the operations include receiving, from the user of the data storage system, a data load request requesting that the data storage system range partition an unknown quantity of future user data, the received user data includes the unknown quantity of future user data. Here, the data load request may request the data storage system to use the clustering key to store the future user data. The data load request may occur at a data query system in communication with the data storage system, the data query system configured to query data of the user stored in the data storage system. The user data may correspond to a quantity of streaming user data that satisfies a dynamic range partitioning threshold, the dynamic range partitioning threshold indicating a minimum total data size.

In some examples, range partitioning each row of the user data into files based on the respective values defined by the partitioning key using the partitioning quantiles includes generating an empty partition for any missing value and during execution of a query on the user data includes identifying that the query includes a respective missing value and excludes the empty partition from read operations of the query. The operations may include receiving a maximum number of partitions for range partitioning and may include determining that a respective number of non-empty partitions is less than the maximum number of partitions. Determining that the respective number of partitions is less than the maximum number of partitions may include generating a count of a number of distinct values defined by the partitioning key in the user data and may include comparing the count of the number of distinct values defined by the partitioning key in the user data to the maximum number of partitions.

In some implementations, the storage constraints include a maximum number of partitions and the operations include determining whether the number of the generated partitioning quantiles is less than the maximum number of partitions. In this implementation, range partitioning each row of the user data into the files based on the respective values defined by the partitioning key using the partitioning quantiles occurs when the number of the generated partitioning quantiles is less than the maximum number of partitions.

In some configurations, the operations include receiving, from the user of the data storage system, a data load request requesting that the data storage system range partition an unknown quantity of future user data and the received user data comprises the unknown quantity of future user data. In this configuration, the operations include receiving a maximum number of partitions for the range partitioning and, during run-time for the data load request, include determining whether the number of the generated partitioning quantiles is greater than the maximum number of partitions. Further, range partitioning each row of the user data into the files based on the respective values defined by the partitioning key using the partitioning quantiles fails to execute when the number of the generated partitioning quantiles is greater than the maximum number of partitions.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2A-2D are schematic views of example data managers for the data management environment of FIG. 1.

Like reference symbols in the various drawings indicate like elements.

DETAILED DESCRIPTION

Figure 1:
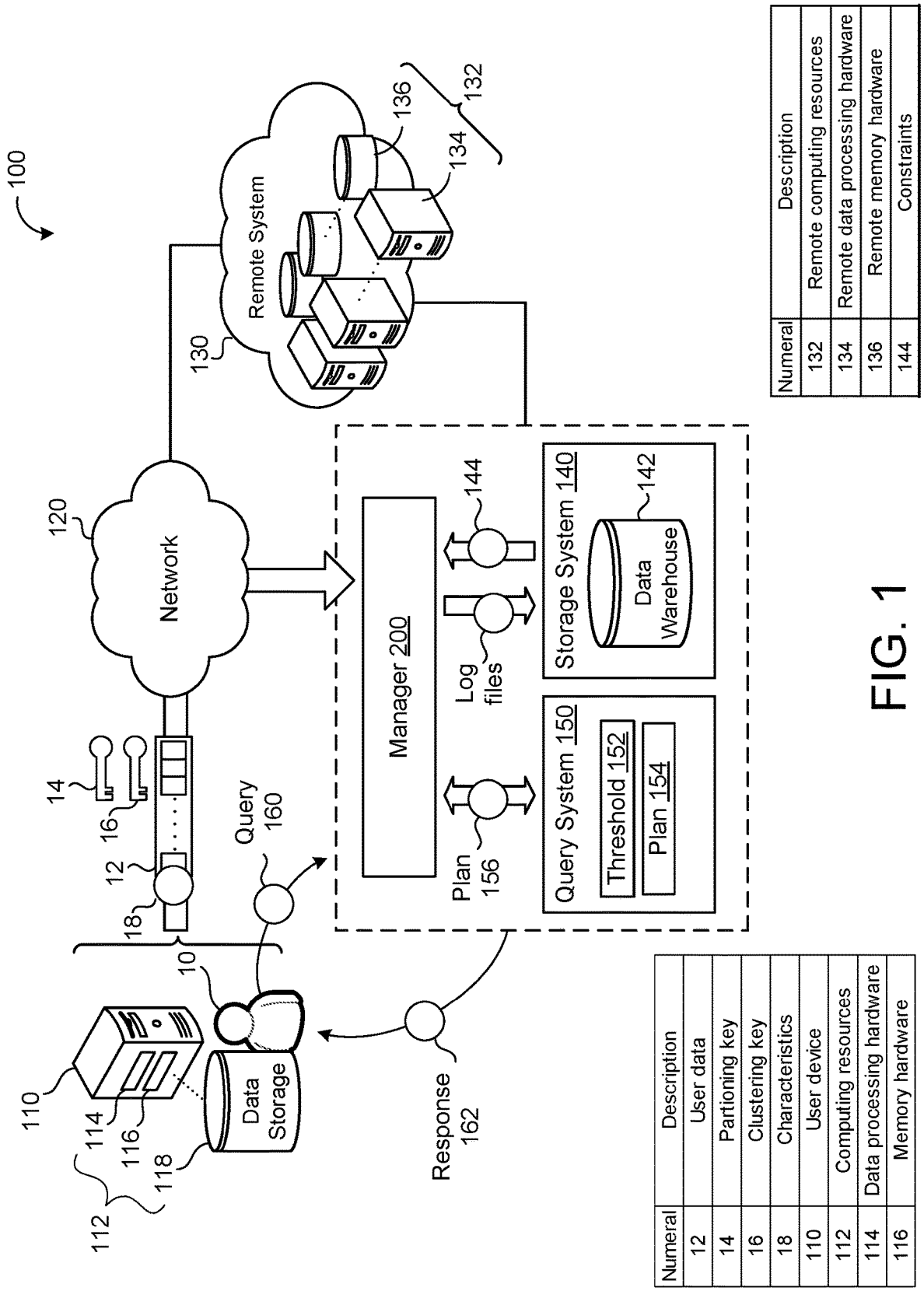
FIG. 1 is a schematic view of an example data management environment.

Data storage systems may store user or client data in one or more large queryable tables. The general structure of the table includes data in some form of individual records organized into rows. The length of a row of data may vary based on a schema of the table and/or a number of columns or fields that are associated with a particular record (i.e., row). A table schema refers to a designated format for a table that may define column names (e.g., fields), data types for particular columns, and/or other information. In some examples, the storage system is configured to generate the table schema based on attributes of the user data it receives. For instance, the storage system receives the user data in a row-oriented format with a particular schema prior to ingestion. In other examples, the user or client coordinates with the storage system to define a schema for user data prior to any transfer of user data to the storage system. Ordinarily, when data storage systems receive user data, the storage system ingests the user data by loading it into one or more files that form the underlying structure that populates the table. Without further organization, the storage system loads the user data into files in an order that the data storage system receives the user data. Here, without further organization other than the way the user data was presented to the storage system, the format of the table does not include any other partitions, groupings, or sorted formatting. This type of table may be referred to as a non-partitioned and non-clustered table. As a result, when the user wants to execute a query on a subsection of his or her data in the data storage system (e.g., a query with a filtering condition), the query may inevitably have to scan the entirety of the user's data in the storage system (i.e., data in a table corresponding to the user's data).

Although this scan of all of the user's data will generate an accurate response to the query, it nonetheless will take an amount of time that could be reduced by formatting the user's data in the storage system in a particular manner. Since some data query systems include cost structures that charge a price based on an amount of data scanned, there is an increased incentive to reduce costs for a user by minimizing an amount of data scanned during a query. Accordingly, for efficiency of time and resources, the data storage system may be configured to organize the user data in a more query efficient format. This is especially possible given the fact that the user both submits the data to the storage system and queries his or her data; a combination that allows the user to coordinate or consolidate such efforts. Some examples of techniques to format data in the storage system is by partitioning data, clustering data, or some combination of both.

Table partitioning is a technique to divide a large table of data into subsets of the table without creating separate tables for each subset. When data in a large table is partitioned into partitions, these partitions correspond to groups of rows of the table that may be accessed and/or maintained separately. An advantage of a partitioned table is that the partitioned table behaves as one single logical table when queried by a query system. When the storage system partitions data, the partitioning assigns each row to a partition based on one or more columns or schema of the data in the table called a partition key. Often, the table is partitioned on a partition key that is relevant to queries. In other words, by using a partition key that is frequently or always referenced when querying the table of data, the query system can use the partition key as a filter to limit its access or read to only the relevant partitions (i.e., the relevant portions of the entire table). This technique, sometimes referred to as partition pruning, enables the query to eliminate the need to read or to scan other portions of the table; improving performance time for the query. Additionally or alternatively, from an administrative perspective, partitioning allows flexibility such that an administrator may manage a partitioned table either collectively (e.g., with respect to the entire table) or individually (e.g., with respect to one or more partitions of the table).

The partition key generally designates a variable or value upon which to partition the user data. Generally, the partition key may refer to any field (e.g., column) corresponding to a row of data, but some forms of partitions are more common due to the nature of queries. For instance, often queries request data corresponding to a particular time (e.g., date) or belonging to a particular range of time (e.g., dates). Based on this frequent form of a query, some more common partitions on user data include partitioning by ingestion time (e.g., a load time when the storage system loaded the user data into storage or an arrival time when the user data arrived at the storage system), by another date or timestamp other than ingestion time (e.g., data access times), or by an integer range. For example, with an ingestion time-partitioning approach, the storage system loads the user data into files (e.g., automatically) according to a date-based time unit (e.g., hourly, daily, weekly, monthly, yearly, etc.). Here, the storage system identifies the ingestion time corresponding to each row of the user data and loads the user data to a file that corresponds to that particular ingestion time. In other words, when the user data spans three days, Monday, Tuesday, and Wednesday, the storage system identifies that four rows of user data correspond to Monday (e.g., based on the ingestion date) and loads these four rows into a Monday file while identifying that two rows of user data correspond to Tuesday (e.g., based on the ingestion date) and loading these two rows into a Tuesday file that is a different file than the Monday file. And finally, the storage system identifies that six rows of user data that correspond to Wednesday (e.g., based on the ingestion date) and loads five of the six rows into a first Wednesday file and the sixth of these six rows into a second new Wednesday file because, in this example, a file has a capacity equal to five rows. Since the table is formed by data blocks corresponding to the files, the table appears as though it has three table subsets, one for each day, Monday, Tuesday, and Wednesday. Here, if a query requests user data for an ingestion date of Tuesday, due to three table subsets, the query may perform a quick lookup (e.g., on metadata associated with the user data in the storage system) to recognize that a table subset corresponds to Tuesday and subsequently scans or performs read operations for two of the twelve rows of user data within the Tuesday subset table. In other words, in this example, this form of partitioning reduces the read operations to one-sixth of the user data. Column-based (e.g., date-based or timestamp-based) partitioning behaves similarly except that, instead of ingestion time, the partitioning occurs based on another time-based variable. For example, one or more columns within a row of the user data may include a partition-able time field.

In some implementations, a partition function defines how to partition data on the partition key. In some examples, the partition function does not define which rows of data in a table to include in a partition group, but rather the partition function identifies boundary values or split points between partitions. In other words, the actual number of partitions for a table is equal to the number of split points plus one. Range partitioning also uses the partition key, but this partitioning process identifies whether or not data falls within (i.e., belongs to) a range specification of the partition key. Here, when data falls outside (e.g., does not belong to) a range specification, range partitioning does not partition the data. In contrast, when data falls within a designated range of the range specification, range partitioning loads the data into files that generate a table subset corresponding to the designated range. For instance, the range specification dictates that user data is to be partitioned into monthly ranges. Here, when user data corresponds to three months, range partitioning identifies each of the months as split points or boundaries for a given range. For example, when the three months are January, February, and March, the January range spans from January $1^{st}$ to January $31^{st}$, while the February range spans from February $1^{st}$ to February $28^{th}$ and the March range spans from March $1^{st}$ to March $31^{st}$. In this example, a partition function may identify a split point corresponding to a boundary for a range and/or whether the split point is inclusive or exclusive. For example, for the January range, the split point may be December $31^{st}$ or January $1^{st}$. When the split point is December $31^{st}$, this date is in December and therefore not included as part of the January range of January $1^{st}$ to January $31^{st}$. Accordingly, a split point of December $31^{st}$ would be an exclusive boundary point since it is not included in the range. On the other hand, a split point of January $1^{st}$ would be an inclusive split point because the range of January $1^{st}$ to January $31^{st}$ includes this split point. To further this example, the partition key may identify a column within a row of user data as the partition value. In other words, if the partition key designates the ingestion time, the storage system performs range partitioning by identifying whether the ingestion time for a row of user data falls into a range for January, February, or March. With range partitioning, a query for a ranged partitioned table can specify predicate filters based on the partitioning key (e.g., a partitioning column such as ingestion time) to reduce the amount of data scanned during the query.

Another approach to formatting a table is by clustering. In a clustered table, the data of the table is organized based on the contents of a clustering key. Here, a clustering key refers to one or more columns (e.g., in a table's schema) upon which to sort the data (e.g., co-locate related data). When clustering occurs over multiple columns, the clustering key identifies an order of the columns that determines the sort order of the data. When a storage operation writes data to a clustered table, the storage system sorts the data using values in the clustering columns and uses these values to organize the data into multiple blocks in the storage system to form the clustered table. With clustered data (i.e., a clustered user data table), a query to filter user data based on clustering key enables the query to eliminate scans of unnecessary data. For instance, when the storage system loads data to a file, the file may either include metadata or be associated with metadata that identifies minimum and maximum values for columns of the user data contained in the load file. With this information, when a query corresponds to clustered data, the query may first lookup metadata corresponding to the clustering key from files and eliminate files that are not pertinent. For instance, if a row of user data corresponds to transactional sales data where one of the columns define the state (location) of a transaction and the transactional sale data table is clustered on the state of a transaction, a query for transactions in the state of California may look at a file and determine, from its metadata, that no row of user data within the file corresponds to a transaction in California. Here, this quick look-up prevents the query from having to perform further read operations on the file.

Unfortunately, particular partitioning techniques have limited capabilities without adequate information ahead of time to establish parameters for the partitioning technique. This is true in the case of range partitioning. For instance, range partitioning has traditionally been difficult to perform dynamically during execution time for a data load. In other words, range partitioning commonly relies on known priors such as how many split points or range partitions are part of the range specification. Yet for user data that is either being streamed to the data storage system or batch processed to the data storage system, it is often not known in advance how much user data the data storage system will be receiving for execution. Without knowing the size of the data being received at the storage system prior to the actually receiving the data, the storage system is generally unable to determine accurate split points (i.e., catered to the actual data) that identify the boundary of ranges for the range partitioning. These issues become further compounded when data storage systems have constraints related to file size or a number of rows of data that a file may store. In other words, there may be constraints of the data storage system itself that affect aspects of range partitioning. For instance, if files can only be a particular size, efficient range partitioning should attempt to factor in this size constraint to ensure that its ranges and/or split points do not lead to files that are under saturated due to the range partitions.

FIG. 1 illustrates an example of a data management environment 100. A user device 110 associated with a user 10 generates user data 12 during execution of its computing resources 112 (e.g., data processing hardware 114 and/or memory hardware 116). For example, the user 10 uses applications operating on data processing hardware 114 of the user device 110 to generate the user data 12. Since various applications have the ability to generate large amounts of user data 12, the user 10 often utilizes other systems (e.g., a remote system 130, a storage system 140, or a query system 150) for user data storage and/or user data management.

In some examples, the user device 110 is a local device (e.g., associated with a location of the user 10) that uses its own computing resources 112 with the ability to communicate (e.g., via the network 120) with one or more remote systems 130. Additionally or alternatively, the user device 110 leverages its access to remote resources (e.g., remote computing resources 132) to operate applications for the user 10. User data 12 generated through the use of the user device 110 may be initially stored locally (e.g., such as in data storage 118 of the memory hardware 116) and then communicated to a remote system 130 or sent upon creation through a network 120 to the remote system 130. For example, the user device 110 communicates the user data 12 to a storage system 140 using the remote system 130.

In some examples, the user 10 utilizes the computing resources 132 of the remote system 130 (e.g., a cloud computing environment) for storage of the user data 12. In these examples, the remote system 130 may receive user data 12 as it is being generated by various user applications (e.g., streaming data). Here, a data stream (e.g., of the user data 12) refers to a continuous or generally continuous feed of data arriving at the remote system 130 for storage and/or further processing. In some configurations, instead of continuously streaming user data 12 to the remote system 130, the user 10 and/or the remote system 130 configures the user data 12 to be sent in batches at frequent intervals such that the remote system 130 has a constant supply of user data 12 to process. Much like the user device 110, the remote system 130 includes computing resources 132 such as remote data processing hardware 134 (e.g., server and/or CPUs) and memory hardware 136 (e.g., disks, databases, or other forms of data storage).

In some configurations, the remote computing resources 132 are resources utilized by various systems associated and/or communicating with the remote system 130. As shown in FIG. 1, these systems may include a storage system 140 and/or a query system 150. In some examples, the functionality of these systems 140, 150 may be integrated together in different permutations (e.g., built-on each other) or separate systems with the ability to communicate with each other. For example, the storage system 140 and the query system 150 may be combined into a single system (e.g., as shown by the dotted line around these systems in FIG. 1). The remote system 130 with its computing resources 132 may be configured to host one or more functions of these systems 140, 150. In some implementations, the remote system 130 is a distributed system whose computing resources 132 are distributed across one or more locations accessible via the network 120.

In some examples, the storage system 140 is configured to operate a data warehouse 142 (e.g., a data store and/or a plurality of databases) as a means of data storage for the user 10 (or multiple users). Generally speaking, a data warehouse 142 stores data from one or more sources and may be designed to analyze, report, and/or integrate data from its sources. A data warehouse 142 enables users (e.g., organizational users) to have a central storage depository and storage data access point. By containing user data 12 in a central depository such as a data warehouse 142, the data warehouse 142 may simplify data retrieval for functions such as data analysis and/or data reporting (e.g., by an analytics system). Furthermore, data warehouses 142 may be configured to store a significant amount of data such that a user 10 (e.g., an organizational user) can store large amounts of historical data to understand data trends. Being that data warehouses 142 may be the main or sole data storage depository for a user's data 12, the storage system 140 may often be receiving large amounts of data (e.g., gigabytes per second, terabytes per second, or more) from user devices 110 associated with the user 10. Additionally or alternatively, as a storage system 140, the storage system 140 and/or storage warehouse 142 may be configured for data security (e.g., data redundancy), for multiple users from a single data source (e.g., multiple employees of an organization), and/or for simultaneous multi-user access. In some configurations, the data warehouse 142 is persistent and/or non-volatile such that data, by default, is not overwritten or erased by new incoming data.

The query system 150 is configured to request information or data from the storage system 140 in the form of a query 160. In some examples, the query 160 is initiated by the user 10 as a request for user data 12 within the storage system 140 (e.g., an export data request). For instance, the user 10 operates through the query system 150 (e.g., an interface associated with the query system 150) to retrieve user data 12 being stored in the data warehouse 142 of the storage system 140. Here, the query 160 may be user-originated (i.e., directly requested by the user 10) or system-originated (i.e., configured by the query system 150 itself). In some examples, the query system 150 configures routine or repeating queries 160 (e.g., at some designated frequency) to allow the user 10 to perform analytics or to monitor user data 12 stored in the storage system 140.

The format of a query 160 may vary, but may include a reference to specific user data 12 stored in the storage system 150 and/or request user data 12 for a particular period of time. For instance, the query 160 requests the previous seven days of user data 12. In some configurations, the user 10 sends user data 12 to the storage system 140 in a particular format such that the query system 150 may generate queries 160 based on information regarding the particular format (e.g., using attributes of the format). For example, data storage systems 140 receive user data 12 in a table format where the user data 12 populates rows and columns of a table. With a table format, the user data 12 within the table may have rows and columns that correspond to the schemas or headings associated with the user data 12. For example, the user data 12 may refer to commercial transactions made by the user 10. In this example, the user data 12 may include columns for a seller, a buyer, a transaction price, a transaction quantity, and other transactional data that the user 10 gathers regarding its transactions. Here, each row may have a heading or schema, such as a transaction number or identifier and/or a time entry associated with the transaction. Since the storage system 140 may receive the user data 12 in a particular format (e.g., the transaction table format), the storage system 140 is configured to store the user data 12 such that elements of the format (e.g., relationships, headings, or other schema) associated with the user data 12 (e.g., providing further context or definition to the user data 12) are accessible to the query system 150. In other words, the query system 150 generates a query 160 that requests the previous seven days of transactions prices.

In response to a query 160, the query system 140 generates a query response 162 fulfilling or attempting to fulfill the request of the query 160 (e.g., a request for particular user data 12). Generally speaking, the query response 162 includes user data 12 that the query system 150 requests in the query 160. The query system 150 may return this query response 162 to an entity that originates the query 160 (e.g., the user 10) or another entity or system communicating with the query system 150. For example, the query 160 itself or the query system 150 may specify that the query system 150 communicates one or more query responses 162 to a system associated with the user 10, such as an analytics system. For instance, a user 10 uses an analytics system to perform analytics on user data 12. Often, query systems 150 are set up to generate routine queries 160 on the user data 12 within the storage system 140 to enable an analytics system to perform its analytics (e.g., at particular frequencies). For example, the query system 150 executes a daily query 160 to pull the last seven days of transaction data for the analytics system to analyze and/or to represent.

In some examples, a query 160 corresponds to a query job. A query job refers to an operation/action that the query system 150 performs on behalf of the user 10. Some examples of actions undertaken by query jobs include loading user data 12 to the storage system 140, exporting user data 12 from the storage system 140, querying user data 12 from the storage system 140, or copying user data 12 from the storage system 140. Generally, a query job is first scheduled and then executed. For instance, with respect a query job to load user data 12 to the storage system 140, this query job may be configured prior to the query system 150 actually being able to transfer or to coordinate the transfer of user data 12 to the storage system 140. In other words, the query job may be setup such that the query system 150 coordinates the transfer of user data 12 on a repeating basis. For example, the query job states transfer user data 12 to the storage system 140 every other day at 5 pm. In some implementations, the query system 150 includes further parameters for a query job. For instance, with a job query requesting to load data, the query system 150 is configured to communicate the user data 12 to the storage system 140 in either a batch form or a streaming form. Yet with respect to either of these forms, the query system 150 may be configured with a dynamic range partitioning threshold 152 that indicates a minimum total data size that the user data 12 has to exceed in order for the query system 150 to send the user data 12 to the storage system 140 for storage processing.

In some implementations, when the query system 150 receives input for a query 160, the query system 150 is configured to determine a plan 154 in order to execute the query 160. In other words, a query 160 often refers to a table at large on a basic level without particular reference to the actual structure of the table in the storage system 140. For example, a query 160 simply states, query the table of user data 12 in the storage system 140 to export transactional data for the state of California over the past week. The query 160 input format is simplified for ease of use as a user interface in order to abstract from the more complex table and/or storage structure of the user data 12 in the storage system 140. Therefore, the user 10 executing or writing a query 160 does not need to know the actual storage structure, but rather only the schema or fields of a table structure at a high level to generate queries 160. The query system 150, in combination with the storage system 140, is able to decompose a query 160 from a user 10 and rewrite the query 160 into a format that identifies potential operators on the user data 12 to perform the query 160 on the underlying structure of the user data 12. That is, when the query system 150 receives a query 160, it digests the query 160 and plans how to execute the query 160 on the actual structure of storage system 140. This planning may require identifying the subsets of the table (e.g., partitions) and/or the files for the table that correspond to the query 160.

In some configurations, even though the query system 150 determines a plan 154 prior to execution, the plan 154 evolves. For example, the query system 150 generates the plan 154 during the planning stages for the query 160 rather than at execution time for the query 160. At execution time, the plan 154 may need to be adapted to accommodate for actual information present at execution that either was not included or not available during planning. For instance, when the query 160 corresponds to a query job requesting to load data to the storage system 140, at the time the user 12 generated the query 160, the actual amount of user data 12 for this query job was an unknown amount of future user data 12 along with other unknowns about the future user data 12 such as the actual size of the user data 12 and/or number of rows within the user data 12. In light of these unknowns, the query system 150 is configured to generate an adapted plan 156 at execution of a query 160 such as a request to load data.

Referring to FIGS. 1 and 2A-2D, the data management environment 100 also includes a manager 200. The manager 200 is configured to manage dynamic range partitioning. Here, dynamic range partitioning refers to range partitioning that occurs during execution time or run-time for a load operation to the storage system 140. It is dynamic in the sense that the range partitioning occurs when the user data 12 is being actually loaded to the storage system 140 so that the manager 200 has to coordinate the generation of partitions (e.g., quantiles) for the user data 12 while also accommodating for constraints 144 of the storage system 140 when the user data 12 is being ingested and stored in files 224. The manager 200 may manage dynamic range partitioning by executing and/or coordinating operations related to systems 140, 150 for the user 10 (e.g., storage operations, and/or query operations). The functionality of the manager 200 may be centralized (e.g., reside in one of the systems 140, 150) or distributed among the systems 140, 150 depending on its design. In some examples, such as FIG. 1, the manager 200 is configured to receive user data 12 from the user 10 and to facilitate storage operations at the storage system 140. For instance, the manager 200 facilitates a data load request by the user 10. In response to the load request by the user 10, the manager 200 ingests the user data 12 and may translate the user data 12 into a query-friendly format using range partitioning. Here, ingestion refers to obtaining and/or importing the user data 12 into the storage system 140 (e.g., into the data warehouse 142) to allow system(s) to use the ingested user data (e.g., by query systems). Generally speaking, data can be ingested in real-time where the manager 200 imports the data as it is being emitted from the source (e.g., the user 10 or user devices 110 of the user 10) or in batches where the manager 200 imports discrete chunks of data a periodic intervals of time. During ingestion, the manager 200 may validate a format of the user data 12 (e.g., to comply with acceptable formats for the storage system 140) and route the user data 12 to the data warehouse 142 (e.g., particular data storage locations in the data warehouse 142 designated for user data 12 of the user 10). The user data 12 may include a partitioning key 14, a clustering key 16, and one or more characteristics 18 associated with the user data 12

Figure 2A:
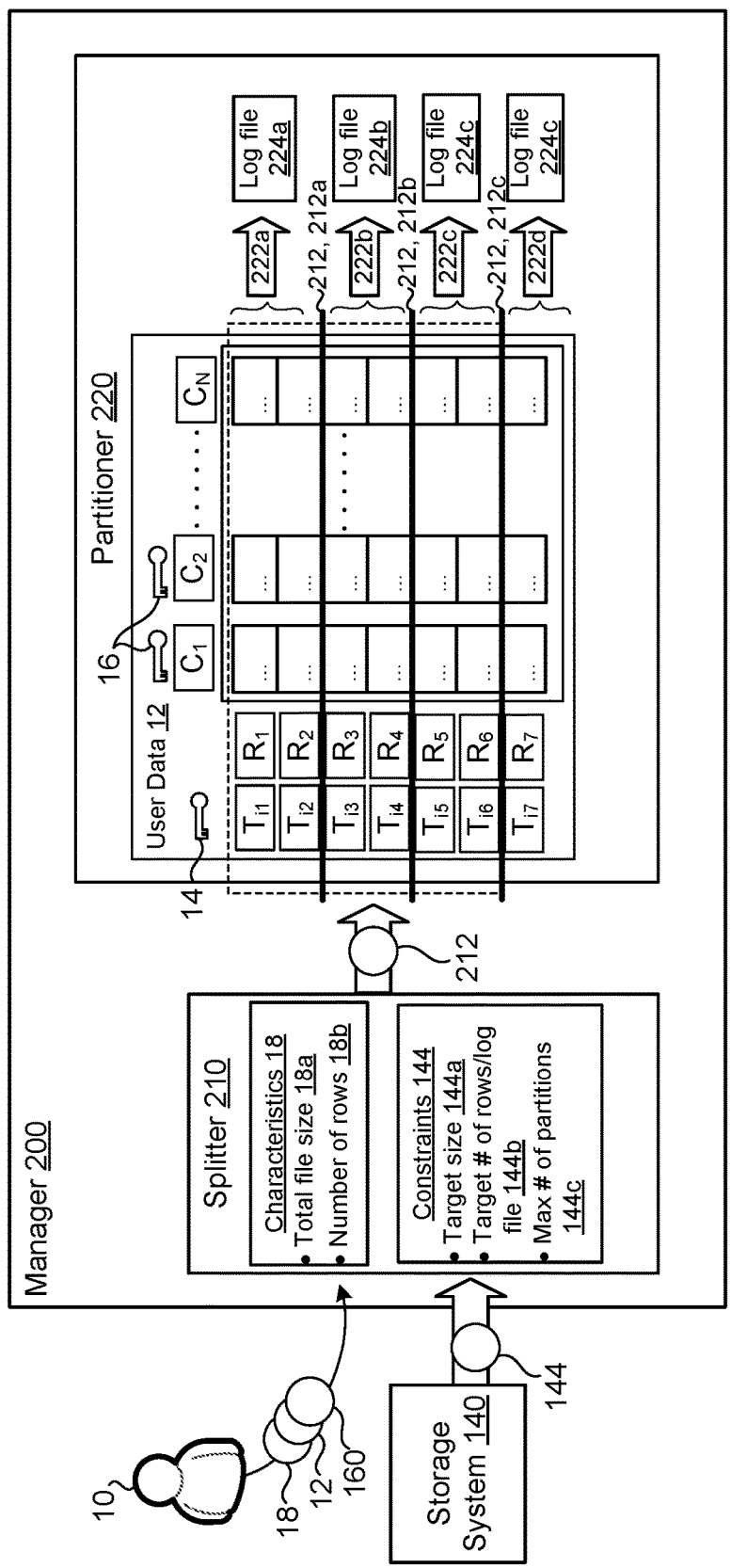

As shown in FIGS. 2A-2D, the manager 200 generally includes a splitter 210 and a partitioner 220. Here, the splitter 210 is configured to obtain the appropriate split points 212 for a value corresponding to the partitioning key 14. For instance, when the value of the partitioning key 14 refers to an ingestion time $T_i$, the splitter 210 generates split points 212 for each distinct day based on the ingestion times $T_i$ for the user data 12. In order to generate split points 212, the splitter 210 receives the query 160 that identifies the load request for the user data 12 along with the characteristics 18 for the user data 12. In some configurations, as shown in FIG. 2A, the characteristics 18 identify a total size 18, 18a for the user data 12 of the load request 160 as well as a number of rows 18, 18b included in the user data 12 of the load request 160. To accurately generate split points 212, the splitter 210 also takes into consideration the constraints 144 of the storage system 140. For example, FIG. 2A shows the storage system 140 constraining a maximum size constraint 144, 144a (also referred to herein as a target file size constraint 144a) for each file 224 within the storage system 140 and/or a target number of rows constraint 144, 144b per file 224. Without considering these constraints 144, the splitter 210 may generate split points 212 that result in the manager 200 (e.g., the partitioner 220) generating ranges of user data 12 that are too large for the files 224 of the storage system 140 to store. In other words, if the splitter 210 generates the split points 212 too sparsely, a large number of user data 12 may be defined as between two split points 212. To generate an accurate estimation of the split points 212, the splitter 210 compares the characteristics 18 of the user data 12 (e.g., the total size 18a for the user data 12 of the load request 160 and/or the number of rows 18b included in the user data 12) to the constraints 144 corresponding to a file 224 of the storage system 140. For instance, the splitter 210 divides the total number of rows 18b in the user data 12 by the number of rows 144b per file 224 identified by the constraints 144 from the storage system 140. The division of these two numbers generates an estimate of a number of rows of the user data 12 that may be present in a given file 224. In some implementations, the splitter 210 divides the total size 18a of the user data 12 by the target file size 144a from the storage constraints 144. Here, by dividing the total size 18a of the user data 12 by the target file size 144a from the storage constraints 144, the splitter 210 generates an additional or an alternative estimate of the number of files 224 that likely will be needed to store the user data 12. With one or both of these calculations, the splitter 210 determines one or more split points 212 for the user data 12 and communicates these split points 212 to the partitioner 220.

In some configurations, based on the split points 212, the partitioner 220 is configured to generate partitions 222 or partitioning quantiles for the user data 12. Here, partitioning quantiles define a range between each adjacent split point 212 of a plurality of split points 212. As shown in FIG. 2A, the partitions 222, 222a-d are based on a division of the column corresponding to the partitioning key 14 (e.g., shown as an ingestion date $T_i$). For each row of user data 12 within the partitioning quantiles between split points 212, the partitioner 220 range partitions each row by loading the row into a file 224. In other words, the partitioner 220 loads a range of values based on the partitioning key 14 together into a file 224. Generally speaking, the partitioner 220 populates a file 224 with user data 12 until the file 224 is at its capacity. Once the file 224 reaches capacity, the partitioner 220 initiates a new file 224 and continues to populate the user data 12 corresponding to a single partition 222 together in the new file 224 in the same manner as the prior file 224.

Figure 2C:
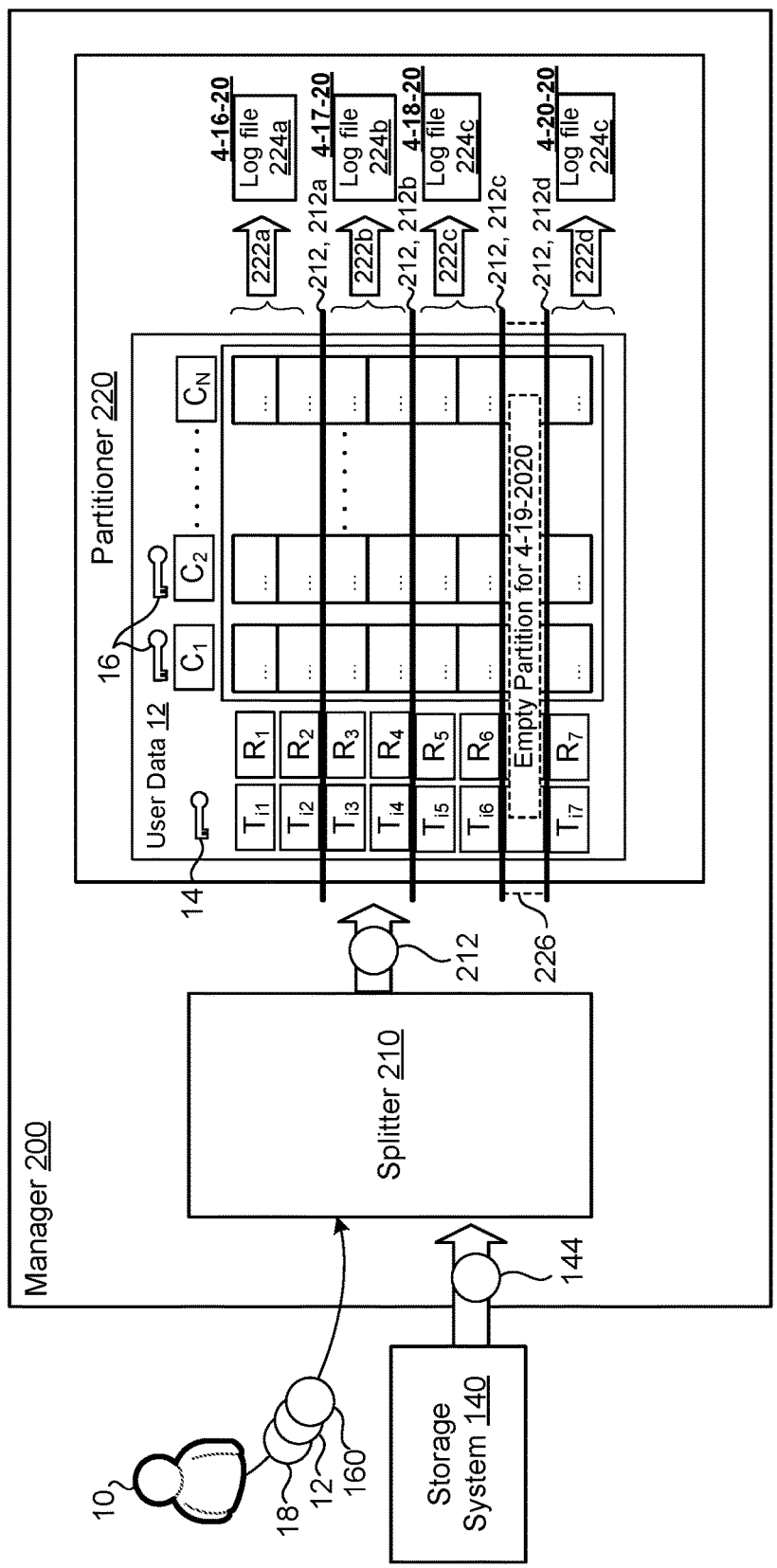

In some implementations, it is not uncommon for the user data 12 to correspond to more than one day (e.g., see FIG. 2C). In these implementations, the storage system 140 may be configured with an additional constraint that each file 224 only includes data from a single date (e.g., a single ingestion date). When this constraint exists at the storage system 140, the partitioner 220, while populating the user data 12 for a particular partition 222, identifies when a time stamp associated with the data transitions from a first date to a second date (e.g., a first day to a second day). When this occurs, the partitioner 220 generates a new file 224 regardless of the capacity of current file 224 being populated and loads the user data 12 with a time stamp of the second date into the new file 224 to prevent a single file 224 from storing user data 12 with two different date time stamps. Based on this date separation technique for the storage system 140, the files 224, by nature, lend themselves to range partitioning.

In some configurations, the partitioner 220 is also configured to range partition the user data 12 when the user data 12 includes one or more clustering keys 16 identifying one or more columns upon which to sort the user data 12. Generally speaking, this compounds the partitioner 220 into partitioning the user data 12 by multiple variables (e.g., a partitioning variable of the partitioning key 14 and one or more clustering variables 16 of the clustering key 16). When this occurs, the partitioner 220 may include an operator that combines the variables of the keys 14, 16 into a new structure. In some examples, the partitioner 220 encodes this structure that combines multiple formatting variables as a string with a string type as the underlying value of the structure. The partitioner 220 may also generate value operations for this new structure such as Less( ) IsComparable( ) Equal( ) AppentToString( ) ParseFromString( ) Copy( ) Move( ) and/or Memory( ). By having this new structure, the practitioner 220 is capable of generating partitioning quantiles (e.g., partitions 222) for multi-variable clustering. For instance, the partitioner 220 would generate this structure for the examples of FIGS. 2A-2D because the clustering key 16 identifies multiple clustering variables, columns $C_1$, $C_2$.

Referring to FIG. 2B, in some examples, the query system 150 operates as a background process while the query system 150 is actively receiving user data 12. As a background process, the query system 150 may collect user data 12 until the amount of user data 12 satisfies the dynamic partitioning threshold 152. In other words, the dynamic partitioning threshold 152 is configured to justify the processing resources to generate split points 212 and/or partitions 222. The query system 150 may apply the dynamic partitioning threshold 152 to either batch loads or streaming loads of user data 12. With the dynamic partitioning threshold 152, once the amount of user data 12 satisfies the threshold 152 (e.g., exceeds some predetermined amount of data), the query system 150 may execute the request to the load the user data 12 to the storage system 140 (e.g., using the manager 200).

Figure 2D:
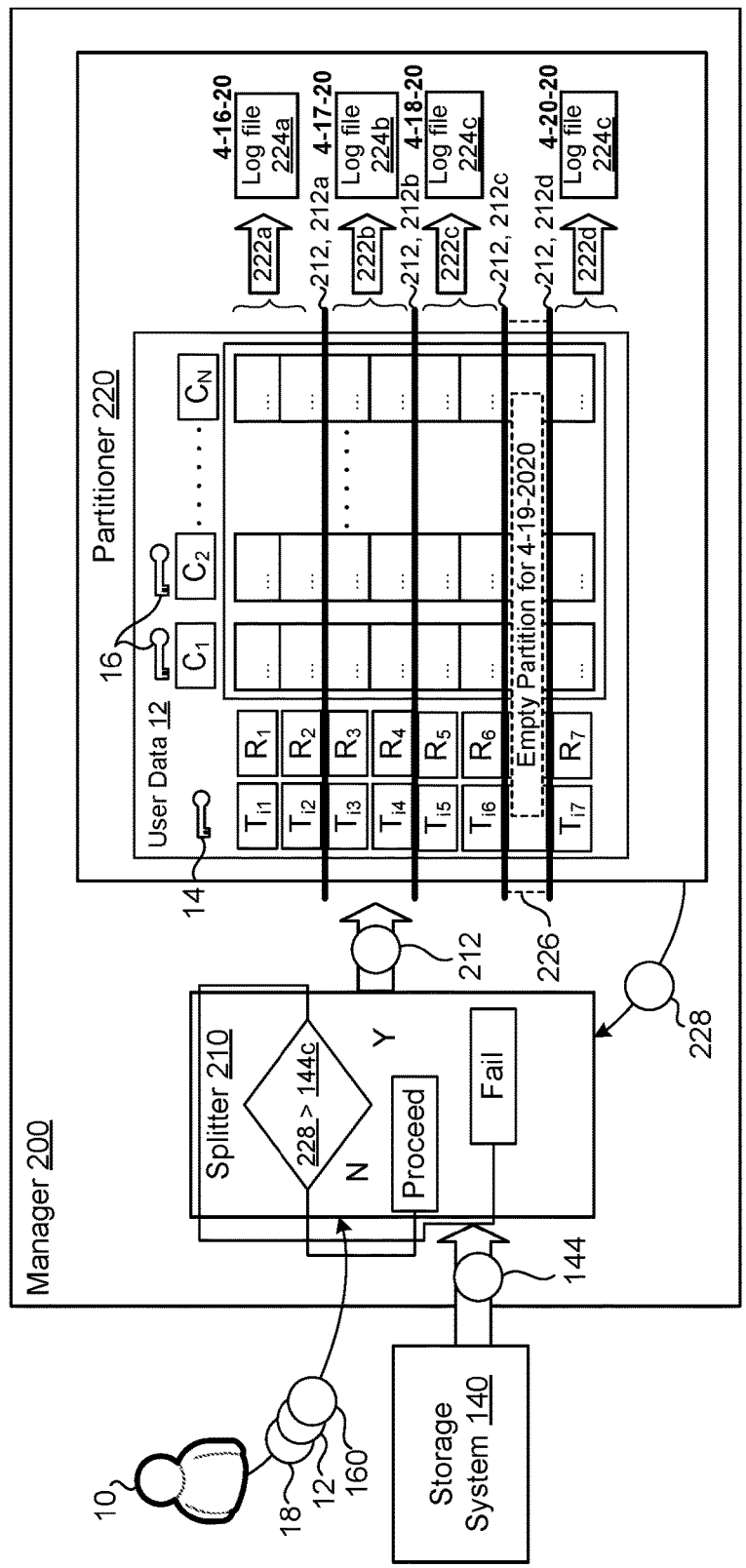

In some configurations, such as FIGS. 2C and 2D, the partitioner 220 is configured to perform quantile expansion or boundary injection. Quantile expansion is a technique that attempts to ensure that each day (e.g., based on ingestion date) has at least one partition 222 such that no two rows of user data 12 with different date values map to the same partition 222. FIGS. 2C and 2D illustrates an example where the user data 12 corresponds to five days of user data 12 (e.g., shown as 4-16-2020, 4-17-2020, 4-18-2020, 4-19-2020, and 4-20-2020). Here, no user data 12 exists for the date of 4-19-2020. In other words, the user data 12 jumps from user data 12 corresponding to 4-18-2020 to 4-20-2020. In the normal splitting and partitioning process without quantile expansion, the splitter 210 would generally not generate a split point 212 corresponding to any boundary for the date of 4-19-2020 because no user data 12 exists for this date. Without a boundary for the date of 4-19-2020, the partitioning process may have an increased likelihood or risk of partitioning two rows with different date values to the same partition 222. In order to avoid this risk, the partitioner 220 performs quantile expansion by analyzing the date values and determining that a boundary (e.g., split points 212, 212c-d) should be injected between the sixth row R6 and the seventh row R7. Here, this boundary injection, generates an empty partition 226 as a type of empty placeholder for the date of 4-19-2020. In some configurations, during execution of a subsequent query 160 to read or to export user data 12 over a date range that includes the empty partition 226, the query 160 is configured to recognize the empty partition 226 and skip (i.e., exclude) the empty partition 226 from any read operation of the query 160.

With continued reference to FIG. 2D, in some examples, the storage system 140 additionally includes a constraint 144 for a maximum number of partitions constraint 144, 144c that may occur within the user data 12 at the storage system 140 during dynamic partitioning. When the storage system 140 includes such a constraint 144 on the maximum number of partitions 144c, the storage system 140 may configure compliance with respect to this constraint 144 in a few different ways. For example, in some configurations, the storage system 140 does not count any empty partitions 226 as contributing to a partitioner's total number of partitions 222. In other words, in this configuration, FIGS. 2C and 2D only have four partitions 222a-d even though there is an empty partition 226 within the stored user data 12. In another approach, manager 200 and/or the storage system 140 determines whether the manager 200 (e.g., the partitioner 220) has violated the maximum number of partitions 144 by counting the total number of values of the partitioning key 14 present in the user data 12 and comparing this count to the number of partitions 222 that the partitioner 220 generates. When count of the total number of values of the partitioning key 14 is less than the count of partitions 222 (i.e., there are more partitions 222 than values), the partitioning process has violated constraint 144 for the maximum number of partitions 144dc. For instance, when the partitioning key 14 corresponds to days, the manager 200 counts the total number of distinct days and evaluates whether this count of days is less than the maximum number of partitions 144. As shown in FIG. 2D, the manager 200 may be configured to determine its own compliance with the maximum number of partitions 144c by comparing a count 228 of partitions 222 (e.g., either total partitions 222, 226 or total non-empty partitions 222) or a count 228 of the distinct number of values of the partitioning key 14 that the partitioner 220 identifies to the maximum number of partitions 222. In FIG. 2D, the splitter 210 is shown performing this determination. When the partitioning process generates too many partitions 222 in violation of the maximum number of partitions 144c, the query 160 for the load job fails and dynamic partitioning does not occur for a given load request due to the violation of this constraint 144c. In contrast, when the number of partitions 222 satisfies the maximum number of partitions 144c, the manager 200 is able to perform the dynamic partitioning for the user data 12.

Figure 3:
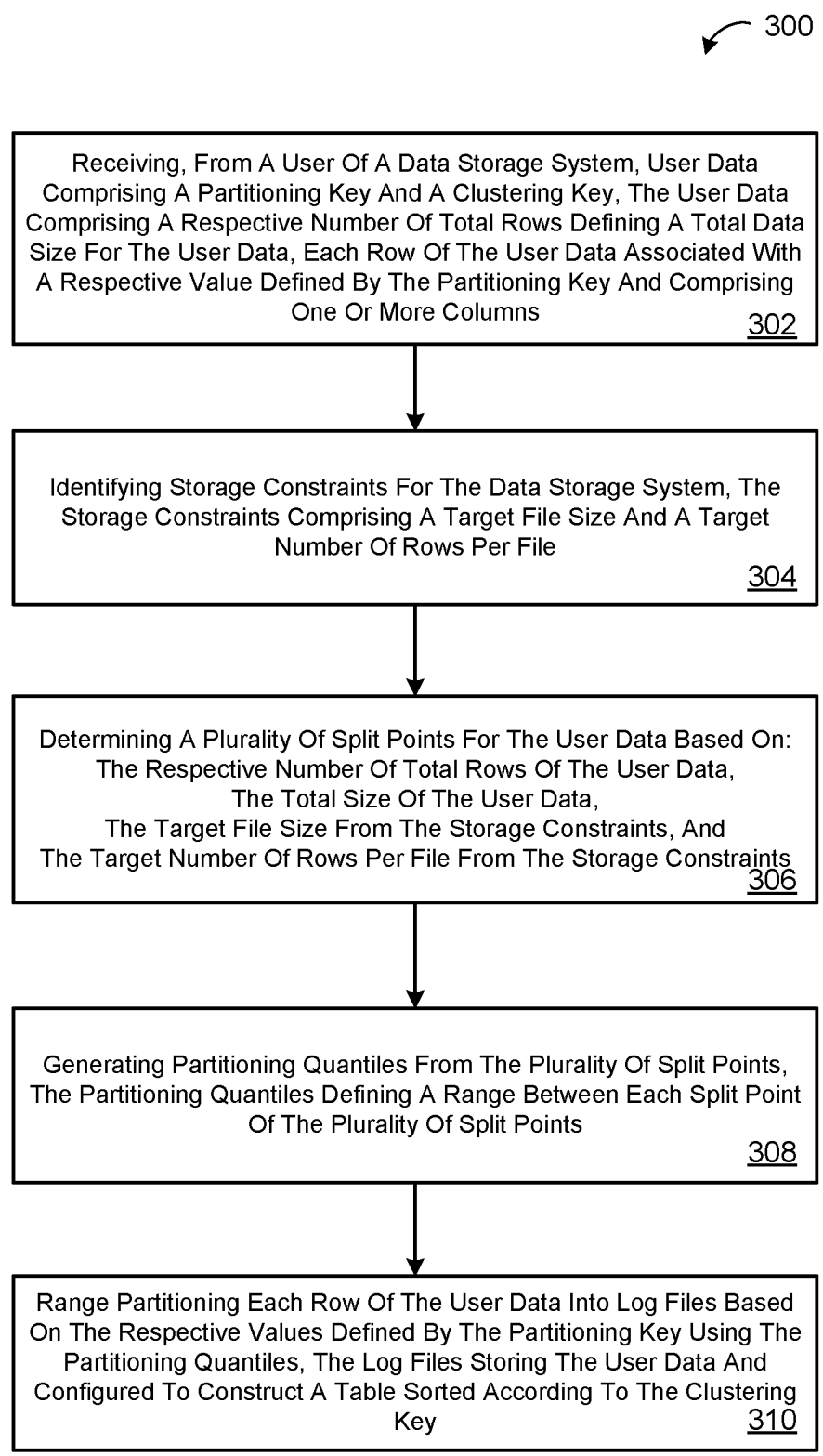
FIG. 3 is a flow chart of example arrangements of operations for method of data processing.

FIG. 3 is a flowchart of an example arrangement of operations for a method 300 of dynamically partitioning data during execution time. At operation 302, the method 300 receives, from a user 10 of a data storage system 140, user data 12 including a partitioning key 14, a clustering key 16, and constraints 18. Here, the constraints 18 of the user data 12 include a respective number of total rows 18b defining a total data size 18a for the user data 12. Each row of the user data 12 is associated with a respective value defined by the partitioning key and includes one or more columns. At operation 304, the method 300 identifies storage constraints 144 for the data storage system 140. The storage constraints 144 include a target file size 144a and a target number of rows 144b per file 224. At operation 306, the method 300 determines a plurality of split points 2212 for the user data 12 based on the respective number of total rows 18b of the user data 12, the total data size 18a of the user data 12, the target file size 144a from the storage constraints 144, and the target number of rows 144a per file 224 from the storage constraints 144. At operation 308, the method 300 generates partitioning quantiles 222 from the plurality of split points 212. Here, the partitioning quantiles 222 define a range between each split point 212 of the plurality of split points 212. At operation 310, the method 300 range partitions each row of the user data 12 into files 224 based on the respective values defined by the partitioning key using the partitioning quantiles 222. The files 224 are configured to construct a table sorted according to the clustering key 16.

Figure 4:
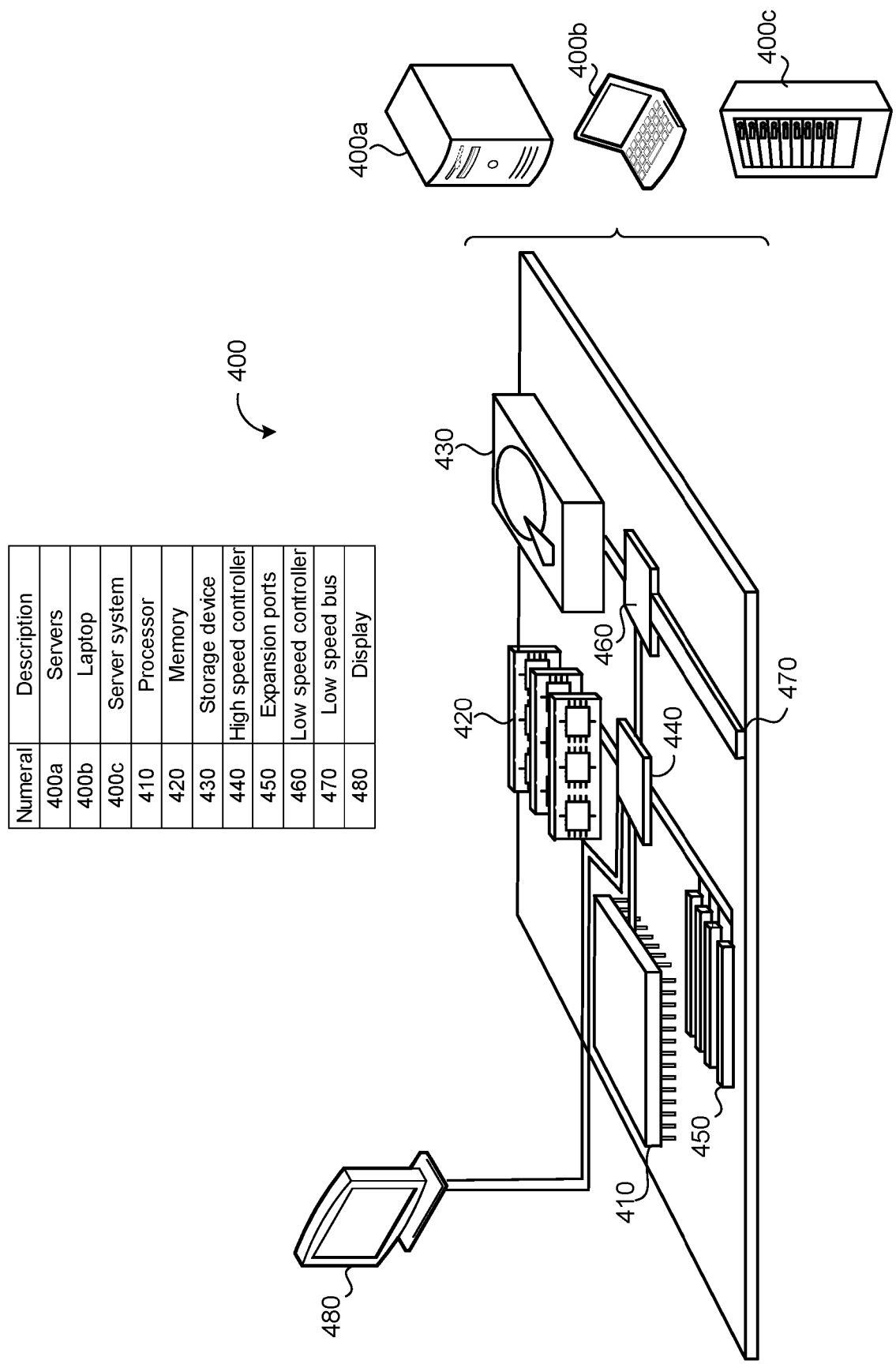
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
    receiving a data load request requesting loading and partitioning of an unknown quantity of user data for storage at a data storage system;
    loading the user data, the user data comprising:
        a partitioning key;
        a total data size of the user data;
        a plurality of rows, each row of the plurality of rows associated with a respective value defined by the partitioning key; and
        one or more columns;
    identifying one or more storage constraints for the data storage system;
    after receiving the user data, determining a plurality of partitioning quantiles defining respective ranges of values of the partitioning key based on the user data and the one or more storage constraints for the data storage system; and
    range partitioning each row of the user data into files based on the respective value associated with the row defined by the partitioning key, and the respective ranges of the values of the partitioning key defined by the plurality of partitioning quantiles.

2. The method of claim 1, wherein:
    the total data size of the user data comprises a total number of rows of the user data;
    the one or more storage constraints comprise a target number of rows per file; and
    a number of partitioning quantiles comprises a ratio of the total number of rows of the user data and the target number of rows per file.

3. The method of claim 1, wherein:
    the one or more storage constraints comprise a target file size; and
    a number of partitioning quantiles comprises a ratio of the total data size of the user data and the target file size.

4. The method of claim 1, wherein:
    the one or more storage constraints comprise a maximum number of partitions; and
    the operations further comprise:
        determining a count of a number of distinct values defined by the partitioning key in the user data; and
        comparing the count of the number of distinct values defined by the partitioning key in the user data to the maximum number of partitions.

5. The method of claim 1, wherein determining the plurality of partitioning quantiles comprises:
    determining a plurality of split points that split the user data into generally equal sized portions; and
    determining the plurality of partitioning quantiles based on the plurality of split points.

6. The method of claim 5, wherein:
    the plurality of split points represents a first splitting of the user data into first portions; and
    the range partitioning of each row of the user data represents a second splitting of the user data into second portions different from the first portions.

7. The method of claim 1, wherein the plurality of partitioning quantiles represent a range partitioning of the user data into generally equal sized partitions.

8. The method of claim 1, wherein the data load request is received at a data query system in communication with the data storage system.

9. The method of claim 1, wherein the user data comprises streaming user data.

10. The method of claim 1, wherein the operations further comprise:
    generating an initially empty partition for a corresponding value of the partitioning key missing in the user data; and
    during execution of a query on the user data:
        determining that the query comprises the missing value of the partitioning key; and
        based on determining that the query comprises the missing value of the partitioning key, excluding the initially empty partition from read operations of the query.

11. A system comprising:
data processing hardware; and
memory hardware in communication with the data processing hardware, the memory hardware storing instructions executed by the data processing hardware that causes the data processing hardware to perform operations comprising:
   receiving a data load request requesting loading and partitioning of an unknown quantity of user data for storage at a data storage system;
   loading the user data, the user data comprising:
      a partitioning key;
      a total data size of the user data;
      a plurality of rows, each row of the plurality of rows associated with a respective value defined by the partitioning key; and
      one or more columns;
   identifying one or more storage constraints for the data storage system;
   after receiving the user data, determining a plurality of partitioning quantiles defining respective ranges of values of the partitioning key based on the user data and the one or more storage constraints for the data storage system; and
   range partitioning each row of the user data into files based on the respective value associated with the row defined by the partitioning key, and the respective ranges of the values of the partitioning key defined by the plurality of partitioning quantiles.

12. The system of claim 11, wherein:
the total data size of the user data comprises a total number of rows of the user data;
the one or more storage constraints comprise a target number of rows per file; and
a number of partitioning quantiles comprises a ratio of the total number of rows of the user data and the target number of rows per file.

13. The system of claim 11, wherein:
the one or more storage constraints comprise a target file size; and
a number of partitioning quantiles comprises a ratio of the total data size of the user data and the target file size.

14. The system of claim 11, wherein:
the one or more storage constraints comprise a maximum number of partitions; and
the operations further comprise:
   determining a count of a number of distinct values defined by the partitioning key in the user data; and
   comparing the count of the number of distinct values defined by the partitioning key in the user data to the maximum number of partitions.

15. The system of claim 11, wherein determining the plurality of partitioning quantiles comprises:
determining a plurality of split points that split the user data into generally equal sized portions; and
determining the plurality of partitioning quantiles based on the plurality of split points.

16. The system of claim 15, wherein:
the plurality of split points represents a first splitting of the user data into first portions; and
the range partitioning of each row of the user data based on the plurality of partitioning quantiles represents a second splitting of the user data into second portions different from the first portions.

17. The system of claim 11, wherein the plurality of partitioning quantiles represent a range partitioning of the user data into generally equal sized partitions.

18. The system of claim 11, wherein the data load request is received at a data query system in communication with the data storage system.

19. The system of claim 11, wherein the user data comprises streaming user data.

20. The system of claim 11, wherein the operations further comprise:
generating an initially empty partition for a corresponding value of the partitioning key missing in the user data; and
during execution of a query on the user data:
   determining that the query comprises the missing value of the partitioning key; and
   based on determining that the query comprises the missing value of the partitioning key, excluding the initially empty partition from read operations of the query.

* * * * *